(12) United States Patent
Nishida et al.

(10) Patent No.: US 8,049,347 B2
(45) Date of Patent: Nov. 1, 2011

(54) GENERATOR-EQUIPPED ENGINE AND METHOD FOR ASSEMBLING SAME

(75) Inventors: Kazutomo Nishida, Wako (JP); Souhei Honda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 712 days.

(21) Appl. No.: 11/913,148

(22) PCT Filed: Jun. 16, 2006

(86) PCT No.: PCT/JP2006/312549
§ 371 (c)(1),
(2), (4) Date: Sep. 19, 2008

(87) PCT Pub. No.: WO2006/137498
PCT Pub. Date: Dec. 28, 2006

(65) Prior Publication Data
US 2009/0091137 A1 Apr. 9, 2009

(30) Foreign Application Priority Data
Jun. 23, 2005 (JP) ................................ 2005-182955

(51) Int. Cl.
*H02K 23/52* (2006.01)
*F02B 63/04* (2006.01)
(52) U.S. Cl. .......................................... 290/10; 290/1 A
(58) Field of Classification Search ................. 290/10, 290/1 A, 4 A, 11, 46; 310/156.53–57
See application file for complete search history.

(56) References Cited

U.S. PATENT DOCUMENTS 2,715,685 A * 8/1955 Brown ........................... 290/1 A
3,405,293 A * 10/1968 Burkett et al. ................... 310/74
(Continued)

FOREIGN PATENT DOCUMENTS
DE 28 43 039 A1 4/1980
(Continued)

OTHER PUBLICATIONS

International Search Report of PCT/JP2006/312549, date of mailing Oct. 9, 2006.

*Primary Examiner* — Julio Gonzalez
(74) *Attorney, Agent, or Firm* — Westerman, Hattori, Daniels & Adrian, LLP (57) ABSTRACT

The engine equipped with a generator is provided. The stator fixed to the crankcase includes a plurality of iron cores arranged in the circumferential direction about the crankshaft, and coils that are wrapped around the plurality of iron cores. The rotor includes a flywheel that is fastened to the crankshaft by a fixing mechanism, and a plurality of permanent magnets fixed to the flywheel. The fixing mechanism mounts the flywheel on the crankshaft in a position in which the center of one permanent magnet among the plurality of permanent magnets coincides with the center point between two mutually adjacent iron cores among the plurality of iron cores when the piston is at the top-dead-center or the bottom-dead-center.

7 Claims, 9 Drawing Sheets

U.S. PATENT DOCUMENTS

| | | | | |
|---|---|---|---|---|
| 4,160,435 A | * | 7/1979 | Sleder | 123/599 |
| 4,580,534 A | | 4/1986 | Blum et al. | |
| 4,683,747 A | | 8/1987 | Hall | |
| 4,908,540 A | * | 3/1990 | Motodate et al. | 310/240 |
| 6,145,375 A | | 11/2000 | Holler | |
| 6,278,194 B1 | * | 8/2001 | Nakagawa et al. | 290/31 |
| 7,004,134 B2 | * | 2/2006 | Higuchi | 123/149 D |
| 2001/0011850 A1 | | 8/2001 | Kashima et al. | |
| 2002/0047459 A1 | * | 4/2002 | Adaeda et al. | 310/216 |
| 2004/0000831 A1 | * | 1/2004 | Hirano et al. | 310/184 |
| 2005/0046191 A1 | * | 3/2005 | Cole et al. | 290/1 A |
| 2009/0085418 A1 | * | 4/2009 | Kobayashi et al. | 310/66 |

FOREIGN PATENT DOCUMENTS

| | | |
|---|---|---|
| FR | 2 619 264 A | 2/1989 |
| JP | 62-203973 A | 9/1987 |

* cited by examiner

GENERATOR-EQUIPPED ENGINE AND METHOD FOR ASSEMBLING SAME

TECHNICAL FIELD

The present invention relates to a generator-equipped engine of the type in which a generator is driven by an engine, wherein the stator of the generator is linked to the crankcase of the engine, and the rotor of the generator is linked to the crankshaft of the engine. The present embodiment also relates to a method for assembling the same.

BACKGROUND ART

Known engines include a generator-equipped engine into which a generator is incorporated. The generator is composed of a stator that is fixed to the crankcase, and a rotor that is capable of rotating. The rotor is composed of a flywheel attached to the crankshaft, and a plurality of magnets provided to the flywheel. The plurality of magnets are arranged in the radial direction of the flywheel.

The following process is an example of the procedure for assembling a generator-equipped engine. First, the stator is attached to the crankcase. A piston is then connected to the crankshaft via a connecting rod. Then, the flywheel is mounted on the crankshaft while the piston is positioned at the top-dead-center point. The generator is thereby incorporated into the engine.

When the stator and the magnets are assembled together, a magnetic force occurs between the stator and the magnets. In other words, cogging (magnetic attraction) occurs between the iron cores of the stator and the magnetic poles of the rotor.

When an engine is built or serviced, the piston must be maintained in the top-dead-center position. However, the effects of cogging tend to make it difficult to position the piston near the top-dead-center point. In other words, when the magnetic force that occurs is unstable, this magnetic force causes the flywheel to rotate. When the flywheel rotates, the crankshaft rotates, and the piston moves away from the top-dead-center point. The flywheel must therefore be prevented from rotating about the crankshaft due to the magnetic force during mounting of the flywheel on the crankshaft, thus adding labor to the engine assembly process.

A technique is therefore desired that can facilitate the work of assembling a generator-equipped engine.

A kick-starting engine for a two-wheeled automobile is described in Japanese Laid-open Patent Application No. 62-203973 as another engine technique. In order to facilitate kick-starting in the engine described in Japanese Laid-open Patent Application No. 62-203973, the engine is configured so that it can easily be detected whether the piston is near the top-dead-center position, which is optimal for kick starting. However, the assembly process is difficult to facilitate even when this type of technique is applied in a generator-equipped engine.

DISCLOSURE OF THE INVENTION

A first aspect of the present invention provides a generator-equipped engine wherein the generator is provided with a stator that is fixed to the crankcase of the engine, and a rotatable rotor disposed opposite the stator; the stator includes a plurality of iron cores arranged in the circumferential direction about the crankshaft of the engine, and coils that are wrapped around the plurality of iron cores; the rotor includes a flywheel that is fastened to the crankshaft by a fixing mechanism, and a plurality of permanent magnets fixed to the flywheel and arranged in the circumferential direction about the crankshaft; and the fixing mechanism is configured so as to stop the flywheel with respect to the crankshaft in a position in which the center of one permanent magnet among the plurality of permanent magnets coincides with the center point between two adjacent iron cores among the plurality of iron cores when the piston connected to the crankshaft is either at the top-dead-center or at the bottom-dead-center.

In the generator-equipped engine of the first aspect of the present invention thus configured, since the center of a magnet is aligned with the center point between two iron cores that are adjacent to each other, the N-pole of the magnet can be disposed facing one of the iron cores among the two iron cores, and the S-pole of the magnet can be disposed facing the other iron core.

The magnetic force exerted on one of the iron cores by the N-pole therefore matches the magnetic force exerted on the other iron core by the S-pole. As a result, cogging (magnetic attraction) occurs between the iron cores of the stator and the magnetic poles of the rotor. The flywheel and the crankshaft are thereby maintained in a motionless state. Since the crankshaft is held in a motionless state, the piston can be kept motionless at the top-dead-center or the bottom-dead-center. The task of maintaining the flywheel in a prescribed position is therefore obviated by holding the piston motionless at the top-dead-center or the bottom-dead-center during mounting of the flywheel on the crankshaft, and the engine becomes easier to assemble.

The process of assembling the valve movement mechanism for driving the exhaust valve or intake valve provided to the engine must also be performed while the piston is maintained at the top-dead-center or bottom-dead-center. However, since the piston can be maintained at the top-dead-center or the bottom-dead-center when the generator is mounted, it becomes easier to mount the valve movement mechanism.

Preferably, the fixing mechanism is composed of a convex fixing member and a concave fixing member fitted with the convex fixing member; the crankshaft has one member selected from the convex fixing member and the concave fixing member; the flywheel has the other member selected from the convex fixing member and the concave fixing member; and rotation of the flywheel relative to the crankshaft is restricted by the fitting of the concave fixing member in the convex fixing member.

The center of a magnet can therefore be aligned with the center point between a pair of adjacent iron cores by the simple mounting operation of fitting the concave fixing member in the convex fixing member during engine assembly.

The convex fixing member is also preferably composed of a key; and the concave fixing member is preferably composed of a key groove into which the key can fit. The key and key groove provided for restricting the rotation of the flywheel relative to the crankshaft can therefore also function as members for aligning the center of one permanent magnet with the center point between two iron cores. Since a member is not needed for positioning, the fixing mechanism can have a simple structure that includes a small number of parts.

It is also preferred that when the engine is viewed from the direction of an end of the crankshaft, and a straight line passing through the center of a cylinder of the engine and the center of the crankshaft is the cylinder central axis, then the center position between any two iron cores that are adjacent to each other among the plurality of iron cores is set so as to coincide with the cylinder central axis, and that the positions of the convex and concave fixing members be set so as to coincide with the cylinder central axis when the piston is either at the top-dead-center or at the bottom-dead-center.

A second aspect of the present invention provides a method for assembling a generator-equipped engine, wherein the method for assembling a generator-equipped engine includes the steps of preparing a stator having a plurality of iron cores arranged at an equal pitch in the circumferential direction about the crankshaft of the engine, and coils that are wrapped around the plurality of iron cores, as well as a flywheel that has a mounting hole and is mounted by fitting onto the crankshaft, and a plurality of magnets for mounting on the flywheel; providing one member selected from a convex fixing member and a concave fixing member to the crankshaft on a reference line, wherein the reference line is a straight line that passes through the center of the crankshaft and the center of the crank pin when the crankshaft is viewed from the shaft end direction; providing the other member selected from the convex fixing member and concave fixing member to the mounting hole of the flywheel; arranging at an equal pitch and mounting all of the magnets to the flywheel after the center of one magnet as a reference among the plurality of magnets is aligned with a position that is separated by a preset prescribed angle from the position of the other fixing member in the flywheel; connecting the piston to the crank pin via the connecting rod when the piston is set in the cylinder of the engine; setting the piston to the top-dead-center or the bottom-dead-center; mounting the stator to the crankcase after the center point between two iron cores that are adjacent to each other is aligned, as a reference among the plurality of iron cores, with the position separated by the prescribed angle from the reference line in the stator; and attaching the flywheel to the crankshaft by fitting together the convex fixing member and the concave fixing member.

In this method for assembling a generator-equipped engine according to the second aspect of the present invention, the center of the magnet coincides with the center point between a pair of adjacent iron cores when the piston is set to the top-dead-center or the bottom-dead-center. The N-pole of the magnet is disposed facing one of the iron cores, and the S-pole of the magnet is disposed facing the other iron core in the pair of adjacent iron cores.

The magnetic force exerted on one iron core by the N-pole therefore matches the magnetic force exerted on the other iron core by the S-pole. As a result, cogging occurs between the iron cores of the stator and the magnetic poles of the rotor. The flywheel and the crankshaft are thereby maintained in a motionless state. Since the crankshaft is held in a motionless state, the piston can be kept motionless at the top-dead-center or the bottom-dead-center. The task of maintaining the flywheel in a prescribed position is therefore obviated by holding the piston motionless at the top-dead-center or the bottom-dead-center during mounting of the flywheel to the crankshaft, and the engine becomes easier to assemble.

A third aspect of the present invention provides a method for assembling a generator-equipped engine, wherein the method for assembling a generator-equipped engine includes the steps of preparing a stator having a plurality of iron cores arranged at an equal pitch in the circumferential direction about the crankshaft of the engine, and coils that are wrapped around the plurality of iron cores, as well as a flywheel that has a mounting hole and is mounted by fitting onto the crankshaft, and a plurality of magnets for mounting on the flywheel; aligning the positions of the plurality of iron cores using the center of the cylinder of the engine as a reference when the stator is mounted on the crankcase; providing one member selected from a convex fixing member and a concave fixing member to the crankshaft on the straight line that passes through the center of the crankshaft and the center of the crank pin when the crankshaft is viewed from the shaft end direction; providing the other member selected from the convex fixing member and concave fixing member to the mounting hole of the flywheel; arranging the plurality of magnets at an equal pitch using the position of the other fixing member as a reference when the plurality of magnets are mounted on the flywheel; connecting the piston to the crank pin via the connecting rod when the piston is set in the cylinder; setting the piston to the top-dead-center or the bottom-dead-center; and attaching the flywheel to the crankshaft by fitting the convex fixing member in the concave fixing member.

In this method for assembling a generator-equipped engine according to the third aspect of the present invention, the center of the magnet coincides with the center point between a pair of adjacent iron cores when the piston is set to the top-dead-center or the bottom-dead-center. The N-pole of the magnet is disposed facing one of the iron cores, and the S-pole of the magnet is disposed facing the other iron core in the pair of adjacent iron cores.

The magnetic force exerted on one iron core by the N-pole therefore matches the magnetic force exerted on the other iron core by the S-pole. As a result, cogging occurs between the iron cores of the stator and the magnetic poles of the rotor. The flywheel and the crankshaft are thereby maintained in a motionless state. Since the crankshaft is held in a motionless state, the piston can be kept motionless at the top-dead-center or the bottom-dead-center. The task of maintaining the flywheel in a prescribed position is therefore obviated by holding the piston motionless at the top-dead-center or the bottom-dead-center during mounting of the flywheel to the crankshaft, and the engine becomes easier to assemble.

The step for aligning the positions of the plurality of iron cores using the center of the cylinder as a reference is preferably a step wherein the center point between two iron cores that are adjacent to each other among the plurality of iron cores is aligned with the center of the cylinder. The step for arranging the plurality of magnets at an equal pitch using the position of the other fixing member as a reference is preferably a step for aligning the center point between two magnets that are adjacent to each other among the plurality of magnets.

BRIEF DESCRIPTION OF THE DRAWINGS

Certain preferred embodiments of the present invention will be described in detail below, by way of example only, with reference to the accompanying drawings, in which.

BEST MODE FOR CARRYING OUT THE INVENTION

Figure 1:
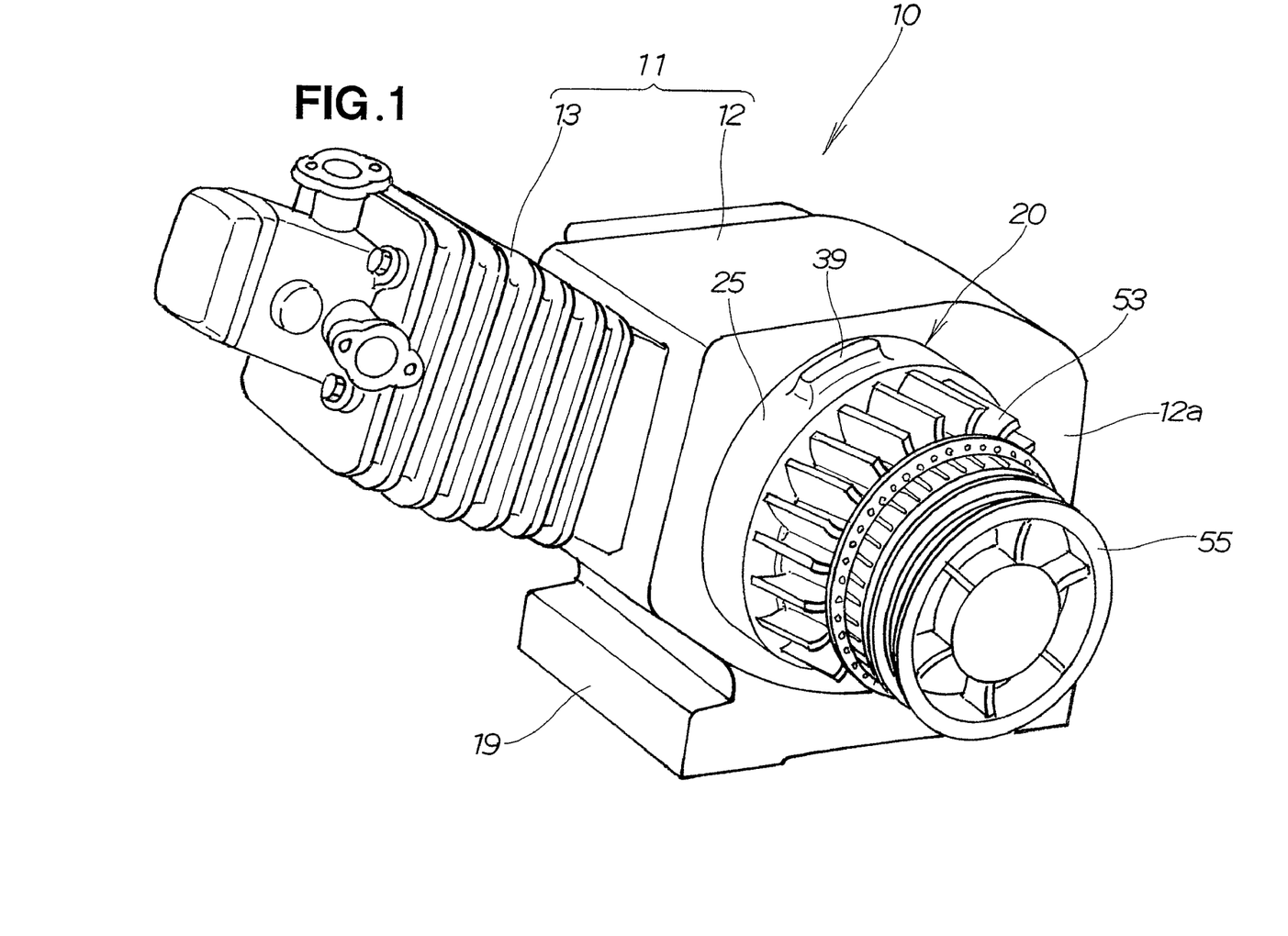
FIG. 1 is a perspective view of the generator-equipped engine according to the present invention.
Figure 2:
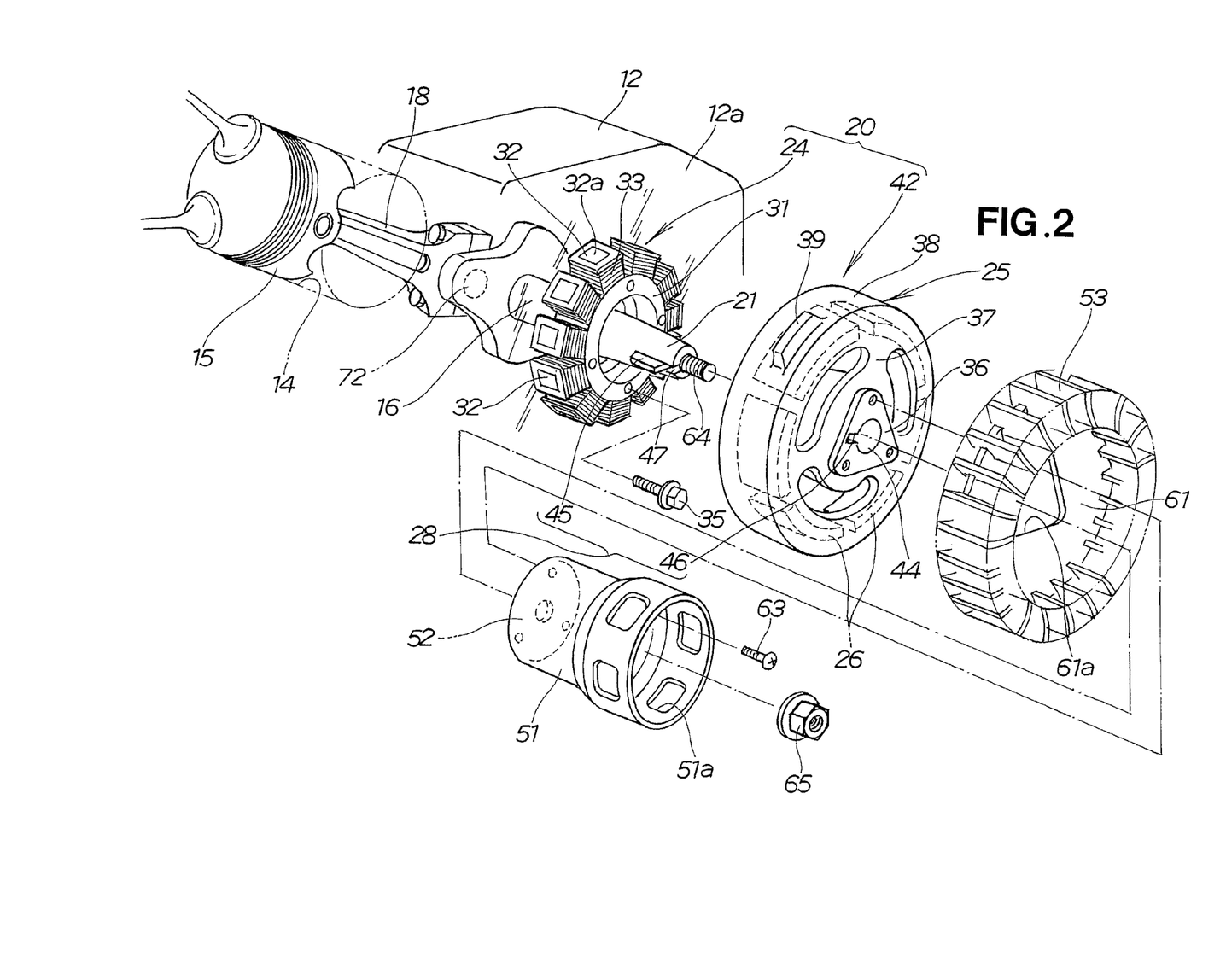
FIG. 2 is an exploded view of the generator-equipped engine shown in FIG. 1.

As shown in FIGS. 1 and 2, the generator-equipped engine 10 is a single slant-cylinder engine in which a single cylinder 14 (see FIG. 2) is slanted at a specific angle with respect to a substantially horizontal base 19 formed at the bottom of a crankcase 12, wherein a generator 20 is provided to the outside of the crankcase 12.

This generator-equipped engine 10 (hereinafter referred to simply as "engine 10") is provided with a casing 11, a piston 15, and a crankshaft 16. The casing 11 is composed of the crankcase 12 and a cylinder block 13. The cylinder block 13 has a piston 15 in the internal cylinder 14.

The crankshaft 16 is housed in the crankcase 12, and has an end portion 21 that protrudes to the outside from the lateral wall 12a of the crankcase 12. The basal end of a connecting rod 18 is rotatably connected to a crank pin 72 (connecting pin 72), whereby the crankshaft 16 is connected to the piston 15 via the connecting rod 18. A flywheel 25, a cooling fan 53, and a recoil stator 55 are attached to the end portion 21 of the crankshaft 16.

The generator 20 is composed of a stator 24 (stationary element 24, charge coil 24) fixed to the lateral wall 12a of the crankcase 12, and a rotor 42 (rotating element 24) attached to the end portion 21 of the crankshaft 16 and disposed opposite the stator 24. This generator 20 is an outer-rotor magnetic generator in which the external periphery of the stator 24 is surrounded by the rotor 42, and the rotation of the rotor 42 causes electrical power to be generated in the stator 24. The stator 24 and the rotor 42 are disposed on the same axis as the crankshaft 16.

Figure 3:
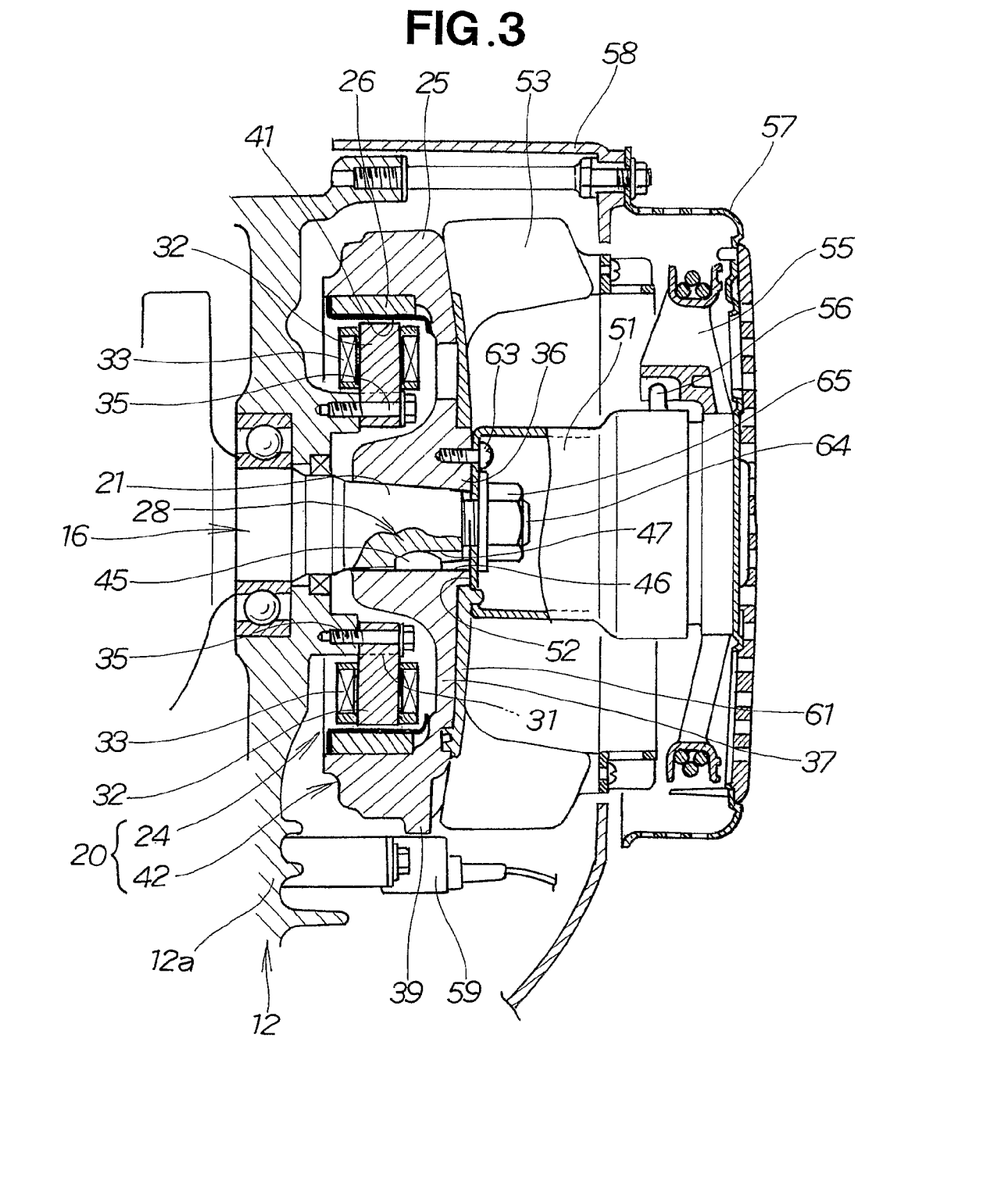
FIG. 3 is a sectional view of the area surrounding the generator shown in FIG. 2.
Figure 4:
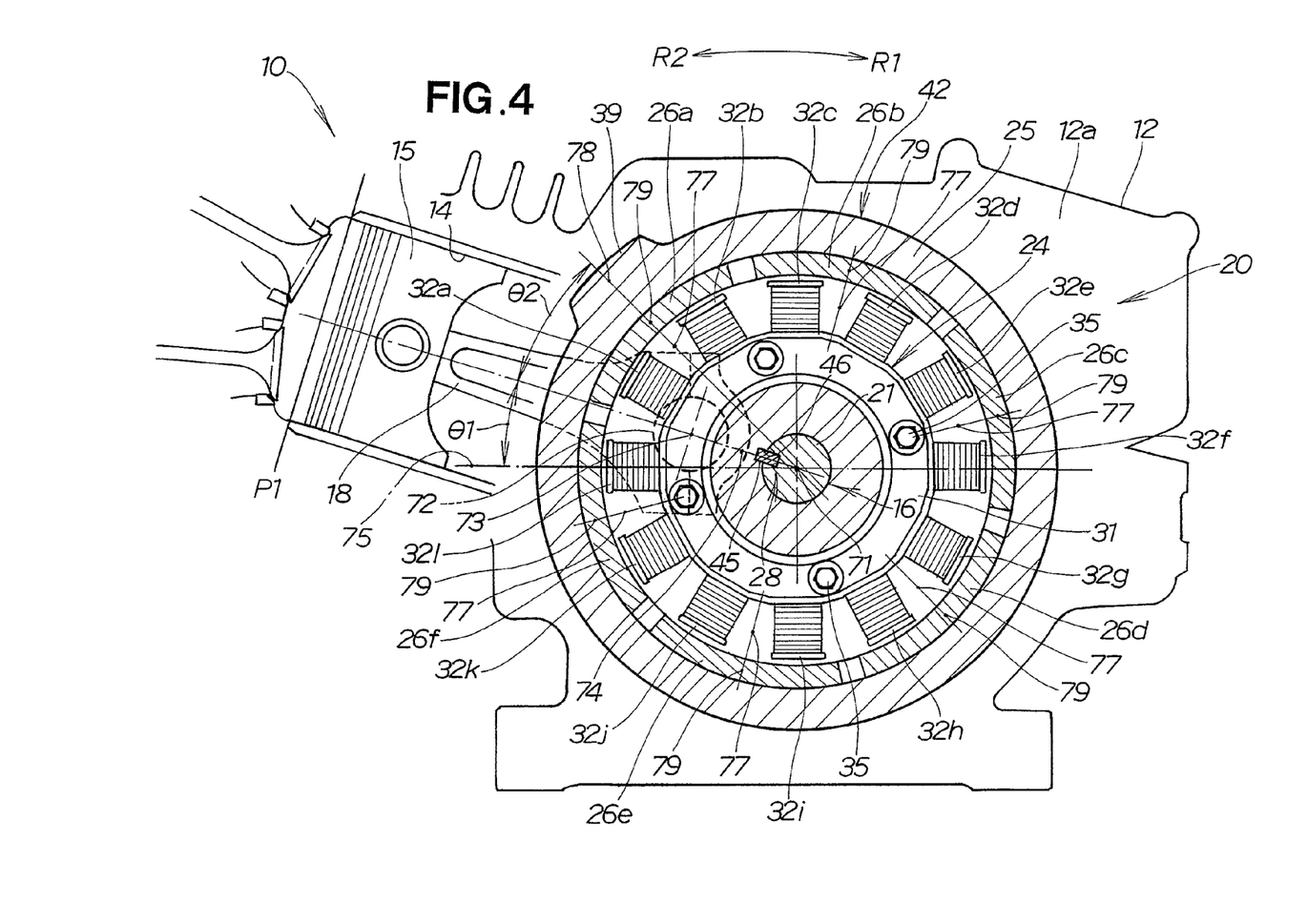
FIG. 4 is a diagram showing the positional relationship between the piston, the crankshaft, and the generator shown in FIG. 2.

As shown in FIGS. 2, 3, and 4, the stator 24 is composed of a ring-shaped base 31 attached to the lateral wall 12a by a plurality of bolts 35, a plurality of iron cores 32 that extend radially outward from the external peripheral face of the base 31, and a plurality of coils 33 that are separately wrapped around the plurality of iron cores 32. The plurality of iron cores 32 are twelve members that are arranged at an equal pitch in the circumferential direction about the crankshaft 16. The base 31 and the plurality of iron cores 32 are formed from a material (iron, for example) that can be attracted by a magnet 26.

The rotor 42 is a rotatable member composed of a flywheel 25, a plurality of magnets 26 arranged in the flywheel 25, and a holder 41 (see FIG. 3) for retaining the plurality of magnets 26 in the flywheel 25. The plurality of magnets 26 are arranged at an equal pitch in the circumferential direction about the crankshaft 16 and are composed of six permanent magnets that are fixed to the flywheel 25.

The flywheel 25 is a cup-shaped member composed of a central boss 36 and a ring portion 38 provided to the boss 36 via a plurality of legs 37. The ring portion 38 is formed in a ring shape so as to surround the external periphery of the stator 24.

As shown in FIGS. 2, 3, and 4, the boss 36 is provided with a mounting hole 44 for fitting with the end portion 21 of the crankshaft 16. The end portion 21 is male-tapered, and the mounting hole 44 is female-tapered. The ring portion 38 is positioned so as to cover the stator 24 when the mounting hole 44 is fitted with the end portion 21. The plurality of magnets 26 are therefore disposed in positions facing the distal ends 32a of the plurality of iron cores 32. In other words, the plurality of magnets 26 are disposed on the external periphery of the distal ends 32a of the plurality of iron cores 32.

The flywheel 25 is mounted on the end portion 21 of the crankshaft 16 by a fixing mechanism 28. The fixing mechanism 28 is composed of a convex fixing member 45 and concave fixing members 46 and 47 (fixing grooves 46 and 47). The convex fixing member 45 is composed of a key. The concave fixing members 46 and 47 are composed of key grooves. Specifically, the fixing mechanism 28 is composed of a key groove 47 formed in the external peripheral face of the end portion 21 in the crankshaft 16, a key groove 46 formed in the mounting hole 44 of the boss 36, and a key 45 that is fitted into the key groove 46 and the key groove 47. Fitting of the key 45 into the key grooves 46 and 47 restricts the rotation of the flywheel 25 with respect to the crankshaft 16.

As shown in FIGS. 2 and 3, the cooling fan 53 is disposed on the same axis as the flywheel 25, and is mounted on the boss 36 by being inserted into a cup-shaped connecting member 51. More specifically, the cooling fan 53 has a disk-shaped supporting wall 61 (base 61). The supporting wall 61 acts as a wall for supporting the cooling fan 53. The supporting wall 61 and the boss 36 become flush with each other when the opening 61a formed in the supporting wall 61 is fitted onto the boss 36.

The cooling fan 53 can be mounted on the flywheel 25 by bringing the bottom portion 52 of the connecting member 51 into contact with the supporting wall 61 and boss 36, fastening the bottom portion 52 to the boss 36 using three bolts 63, and fastening a nut 65 to a threaded portion 64 formed on the end portion 21.

The recoil stator 55 is disposed adjacent to the cooling fan 53, is covered by a stator cover 57, and is rotatably mounted on the stator cover 57. The ratchet 56 of the recoil stator 55 is connected to the locking hole 51a (see FIG. 2) of the connecting member 51. The stator cover 57 is mounted on a fan cover 58 for covering the generator 20 and cooling fan 53. The fan cover 58 is mounted on the lateral wall 12a. By manually turning the recoil stator 55, the crankshaft 16 can be turned via the connecting member 51 and the engaging structure composed of the ratchet 56 and the locking hole 51a.

As shown in FIGS. 2 and 3, the ring portion 38 of the flywheel 25 has a protrusion 39 that protrudes radially outward from one location on the external peripheral face. The lateral wall 12a has a proximity sensor or other rotational speed detection sensor 59. When the flywheel 25 is rotated, the rotational speed of the crankshaft 16 can be detected by the rotational speed detection sensor 59 by measuring the timing at which the protrusion 39 passes through the vicinity of the rotational speed detection sensor 59.

The protrusion 39 also serves as a positioning member used when the plurality of magnets 26 are positioned with respect to the flywheel 25. There is no need to provide a separate member for positioning the plurality of magnets 26. The rotor 42 can be given a simple structure that includes a small number of parts.

The positional relationship between the six magnets 26 and the twelve iron cores 32 will next be described based on FIGS. 4 and 5. Individual reference symbols 32a through 32l are used to identify the twelve iron cores 32 in order to simplify the description. Individual reference symbols 26a through 26f are also used to identify the six magnets 26.

Figure 5:
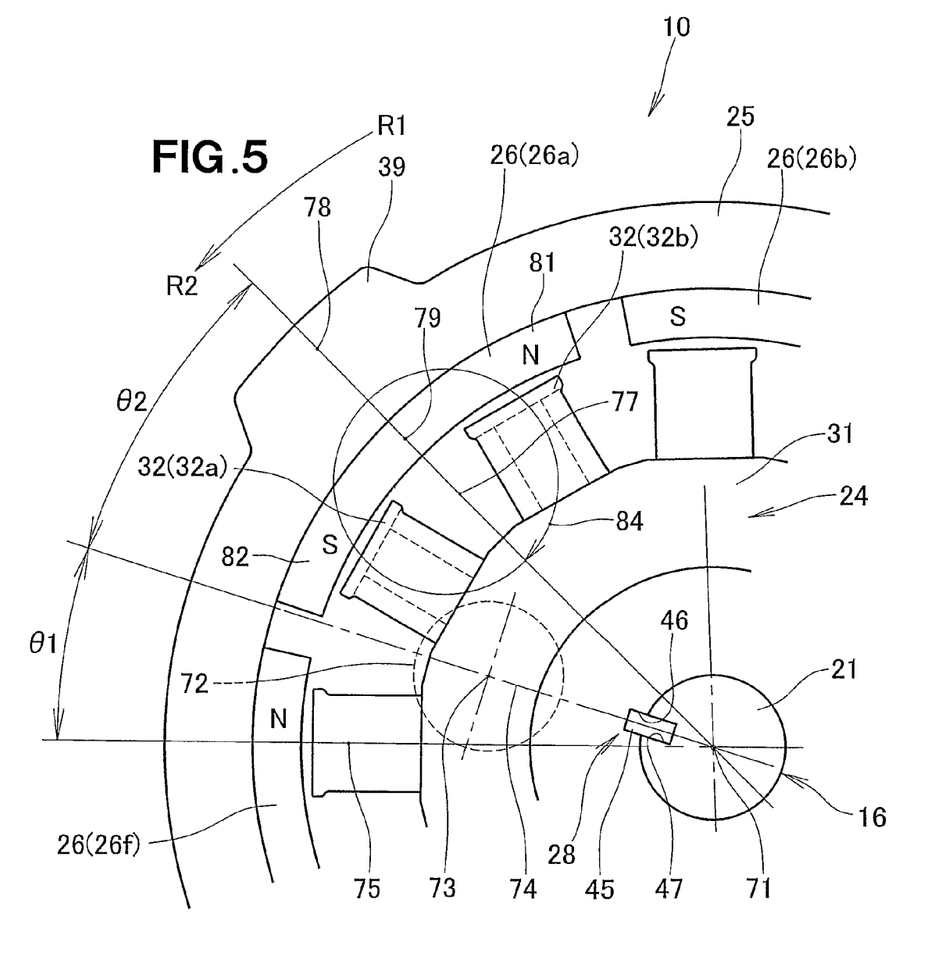
FIG. 5 is a partial enlarged view showing the positional relationship between the crankshaft, the stator, the rotor, and the fixing mechanism shown in FIG. 4.

As shown in FIGS. 4 and 5, the straight line 74 that passes through the center 71 of the crankshaft 16 and the center 73 of the crank pin 72 when the engine 10 is viewed from the shaft-end direction of the end portion 21 is designated as "reference line 74." This reference line 74 is also the straight line that passes through the center 71 of the crankshaft 16 and the center of the cylinder 14 when the engine 10 is viewed from the shaft-end direction of the crankshaft 16. The term "cylinder center line 74" will be used as appropriate hereinafter to refer to the reference line 74. The reference line 74 is tilted at a preset specific angle θ1 in the direction of the arrow R1 (the clockwise direction in the drawing) with respect to the horizontal line 75 that passes through the center 71 of the crankshaft 16. The cylinder 14 is slanted at an angle θ1 with respect to the horizontal line 75.

The position of the center of the fixing mechanism 28, i.e., the position of the center of the key 45 and key grooves 46 and 47, is set so as to coincide with the reference line 74 when the piston 15 is positioned at top-dead-center P1 in the cylinder 14. Consequently, the position of the fixing mechanism 28 is tilted upward at an angle θ1 from the horizontal line 75 when the piston 15 is positioned at top-dead-center P1. The coil mounting angle of the stator 24 is therefore determined on the basis of the positions of the key 45 and key grooves 46 and 47.

Among the twelve iron cores 32a to 32l disposed in the direction of the arrow R1 with respect to the reference line 74, the pair of reference iron cores 32 and 32 that are closest to the reference line 74 (disposed near the upper side with respect to the reference line 74) are referred to as the reference iron cores 32a and 32b. The reference iron cores 32a and 32b are two iron cores that are adjacent to each other. The term "inter-iron-core center 77" will be used to refer to the straight line 74 that passes through the center 71 of the crankshaft 16 and the center point between the two adjacent iron cores 32a and 32b, i.e., the position between these iron cores. The inter-iron-core center 77 is set in a position that is displaced by an amount commensurate with the coil mounting angle θ2 in the direction of the arrow R1 from the reference line 74. The coil mounting angle θ2 is a specific preset angle. All of the iron cores 32a through 32l are arranged in sequence at an equal pitch in the direction of the arrow R1 from the position of the reference iron core 32a.

The arrangement of the plurality of magnets 26a through 26f is set on the basis of the position of the key 45, i.e., the reference line 74. As shown in FIGS. 3 and 4, the plurality of magnets 26 are formed in an arcuate shape so as to conform to the internal peripheral face of the ring portion 38, and are retained against the internal peripheral face of the ring portion 38 by a ring-shaped holder 41. As shown in FIGS. 4 and 5, the reference magnet 26a is formed in a narrow bar shape in the circumferential direction (rotation direction of the flywheel 25) about the crankshaft 16, and is set so that one end 81 thereof is the N-pole, and the other end 82 thereof is the S-pole. The remaining magnets 26b through 26f are configured in the same manner, and their polarities have the same orientation.

The term "protrusion center line 78" is used herein to refer to the straight line 78 that passes through the center 71 of the crankshaft 16 and the center in the circumferential direction of the protrusion 39. The term "magnet center 79" is used herein to refer to the straight line that passes through the center 71 of the crankshaft 16 and the center in the circumferential direction of the reference magnet 26a.

The key groove 46 in the flywheel 25 is formed in the position of the reference line 74, which is displaced at an angle θ2 in the direction of the arrow R2 (counterclockwise direction in the drawing) with respect to the protrusion center line 78. The reference magnet 26a is disposed so that the magnet center 79 coincides with the protrusion center line 78. All of the magnets 26a through 26f are arranged in sequence at an equal pitch in the direction of the arrow R1 from the position of the reference magnet 26a.

The relationship in which the iron cores 32a through 32l are arranged with respect to the crankcase 12 is determined by the angles θ1 and θ2. For example, by appropriately setting the angles θ1 and θ2, the positions of the iron core 32f and iron cores 32l can be caused to conform to the position of the horizontal line 75.

As is apparent from the description given above, the mounting angle θ2 from the position of the key groove 46 to the magnet center 79 of the magnet 26a matches the mounting angle θ2 from the position of the key 45 to the inter-iron-core center 77 when the piston 15 is set to the top-dead-center P1 position. As a result, the position of the magnet center 79 of the reference magnet 26a coincides with the inter-iron-core center 77 between the pair of iron cores 32a and 32b. Therefore, by providing the key 45 to the crankshaft 16 and providing the key groove 46 to the flywheel 25, the angle θ2 from the key groove 46 to the magnet center 79 can be caused to conform to the mounting angle θ2 from the position of the key 45 to the inter-iron-core center 77. The magnet center 79 can thus be caused to conform to the inter-iron-core center 77 by the simple assembly step of merely locking the key groove 46 onto the key 45.

The number of iron cores 32 is twice the number of magnets 26 (in other words, there are half as many magnets 26 as there are iron cores 32). The entire length of one magnet 26 in the circumferential direction generally corresponds to the distance between two iron cores 32 in the circumferential direction. Therefore, when the magnet center 79 coincides with the inter-iron-core center 77, one end 81 (specifically, the N-pole) of the magnet 26a faces the iron core 32b, and the other end 82 (specifically, the S-pole) of the magnet 26a faces the iron core 32a.

As described above, the iron cores 32a and 32b and the base 31 of the stator 24 are members that are formed from a material (iron, for example) that can be attracted by the magnet 26a. The magnetic force 84 that acts from one end 81 in the magnet 26a to the other end 82 reaches the other end 82 through the base 31 and the iron core 32a. The magnetic force 84 that acts between one end 81 and the iron core 32b and the magnetic force 84 that acts between the other end 82 and the iron core 32a have the same strength. Therefore, the magnetic force exerted on the iron core 32b by one end 81 matches the magnetic force exerted on the iron core 32a by the other end 82. The magnet 26a is therefore retained in the position in which the one end 81 faces the iron core 32b, and the other end 82 faces the iron core 32a, i.e., in the position shown in FIG. 5.

Among the remaining five magnets 26b through 26f, the magnet center 79 of the magnet 26b coincides with the inter-iron-core center 77 between the pair of iron cores 32c and 32d, in the same manner as the magnet 26a. The magnet 26b is retained in the position in which one end (the N-pole) faces the iron core 32d, and the other end (the S-pole) faces the iron core 32c, i.e., in the position shown in FIG. 4, in the same manner as the magnet 26a.

The other magnets 26c through 26f are also arranged in the same manner as the magnets 26a and 26b. Specifically, as shown in FIG. 4, the magnet center 79 of the magnet 26c is maintained so as to coincide with the inter-iron-core center 77 between the pair of iron cores 32e and 32f. The magnet center 79 of the magnet 26d is maintained so as to coincide with the inter-iron-core center 77 between the pair of iron cores 32g and 32h. The magnet center 79 of the magnet 26e is maintained so as to coincide with the inter-iron-core center 77 between the pair of iron cores 32i and 32j. The magnet center 79 of the magnet 26f is maintained so as to coincide with the inter-iron-core center 77 between the pair of iron cores 32k and 32l.

The method for assembling the generator-equipped engine 10 will next be described with reference to FIGS. 6A through 8B.

Figure 6A:
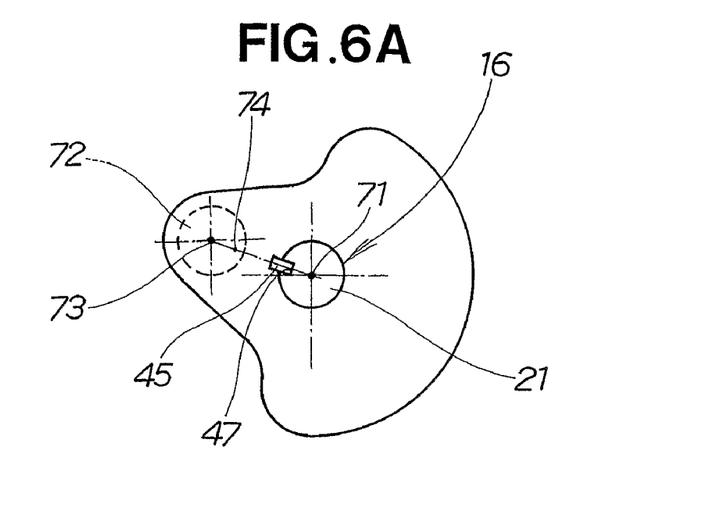
FIGS. 6A and 6B are diagrams showing the procedure in which the crankshaft, rotor, and fixing mechanism shown in FIG. 2 are aligned.

First, the key groove 47 is formed at the end portion 21 of the crankshaft 16, as shown in FIG. 6A. The center of this key groove 47 is set on the reference line 74.

The key 45 is then set on the reference line 74 by fitting the key 45 into the key groove 47.

Figure 6B:
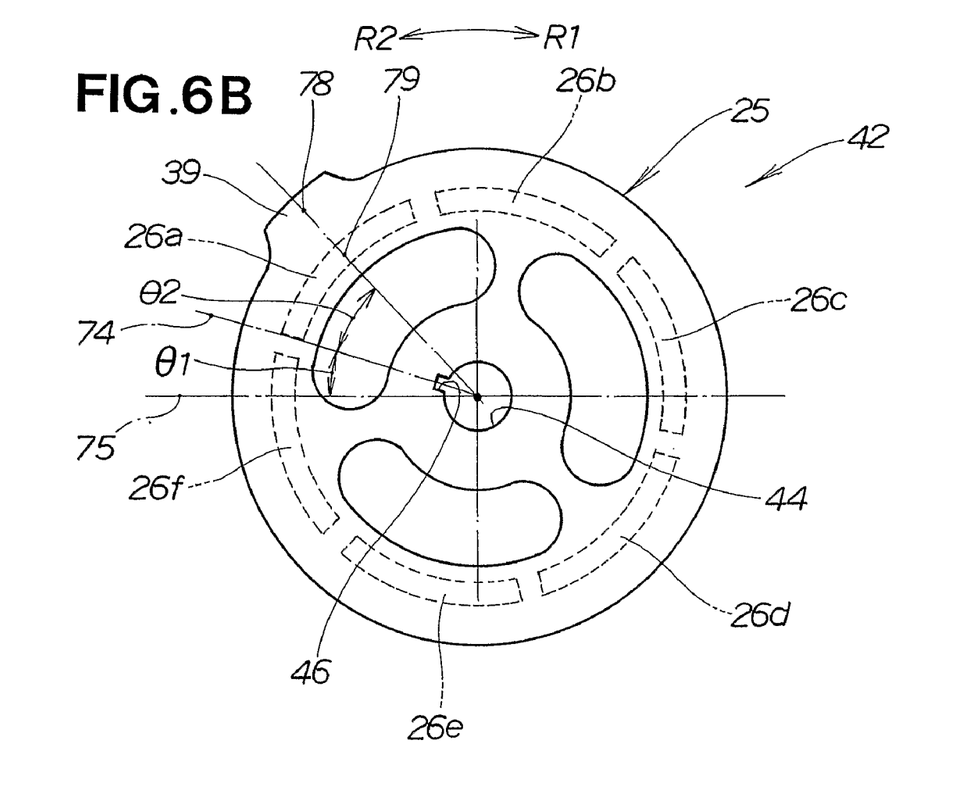

The key groove 46 is then formed in the flywheel 25, as shown in FIG. 6B. The center of this key groove 46 is set on the reference line 74 that is separated from the protrusion center line 78 by angle θ2 in the direction of the arrow R2.

The magnet center 79 of one magnet 26a is then aligned with the protrusion center line 78, and this magnet 26a is mounted on the flywheel 25.

The magnet 26a is then mounted on the flywheel 25 in a state in which the magnet center 79 of one magnet 26a is aligned with the protrusion center line 78. In other words, the magnet center 79 is aligned at the prescribed angle θ2 from the key groove 46 in relation to the reference line 74, and the magnet 26a is mounted on the flywheel 25.

Then, using this magnet 26a as a reference, the remaining five magnets 26b through 26f are mounted in sequence on the flywheel 25 at an equal pitch in the direction of the arrow R1. The rotor 42 is thereby completed.

Figure 7A:
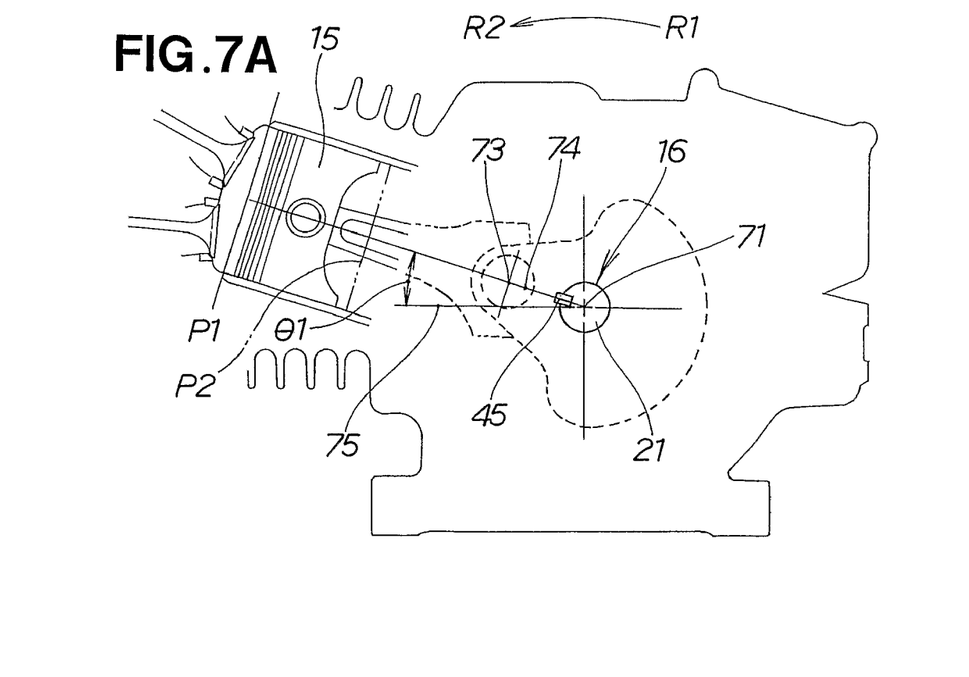
FIGS. 7A and 7B are diagrams showing the procedure in which the piston, crankshaft, stator, and fixing mechanism shown in FIG. 4 are aligned.

The piston 15 is then positioned at top-dead-center P1, as shown in FIG. 7A. As a result, the center of the key 45, i.e., the reference line 74, coincides with a position that is displaced an angle θ1 in the direction of the arrow R1 from the horizontal line 75. The center of the key 45 is maintained in this state.

Figure 7B:
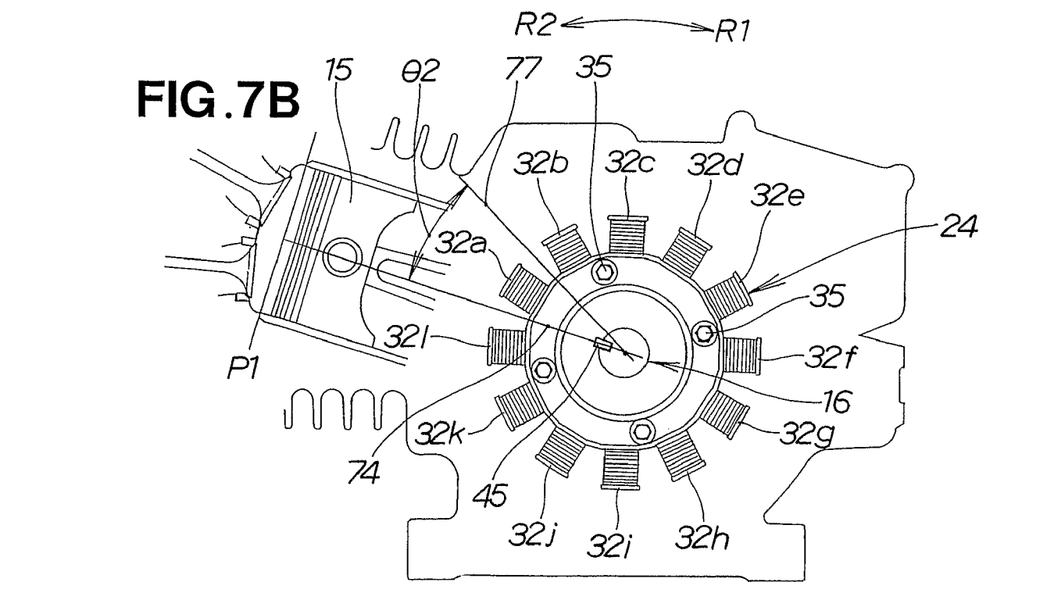

The coil mounting angle of the stator 24 is then determined using the position of the key 45 as a reference, as shown in FIG. 7B. Specifically, the positions of a pair of iron cores 32a and 32b that are adjacent to each other are placed near the top side with respect to the reference line 74. The inter-iron-core center 77 of the pair of iron cores 32a and 32b is then aligned with a position that is displaced from the reference line 74 by the coil mounting angle θ2 in the direction of the arrow R1. In other words, the inter-iron-core center 77 of the pair of iron cores 32a and 32b is aligned with a position that is separated by a prescribed angle θ2 from the key 45. In this state, the stator 24 is attached to the lateral wall 12a of the crankcase 12 by a bolt 35.

Figure 8A:
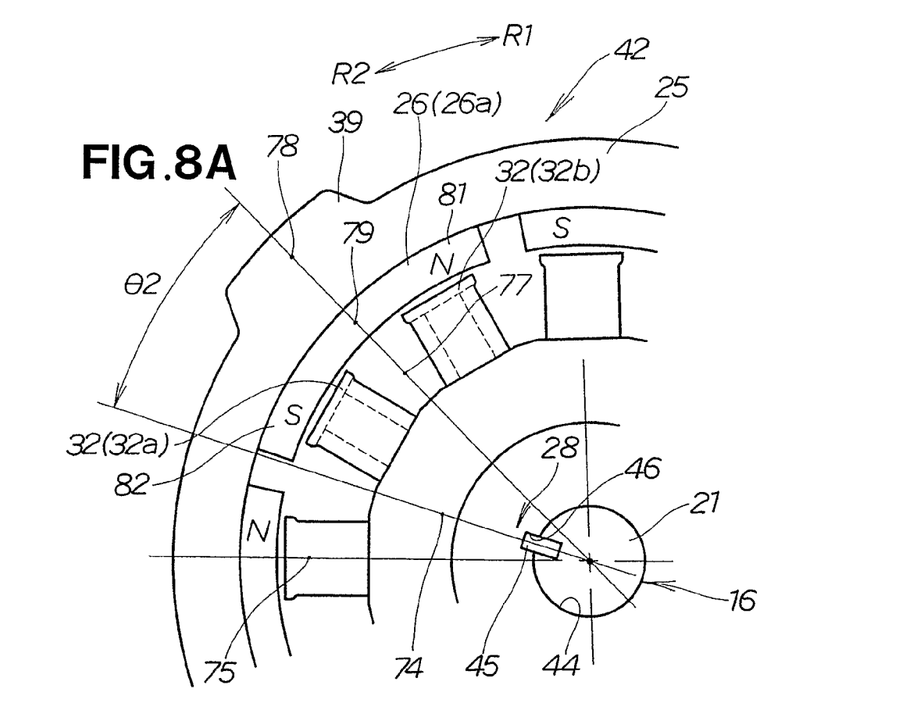
FIGS. 8A and 8B are diagrams showing the procedure in which the stator and rotor shown in FIG. 4 are aligned.

The rotor 42 is then mounted on the crankshaft 16, as shown in FIG. 8A. Specifically, the mounting hole 44 of the flywheel 25 is placed on the end portion 21 of the crankshaft 16, the key groove 46 of the flywheel 25 is fitted with the key 45, and the mounting operation is completed.

As described above, the key groove 46 of the flywheel 25 is formed in a position that is separated by the angle θ2 in the direction of the arrow R2 with respect to the protrusion center line 78. The magnet 26a is mounted on the flywheel 25 in a state in which the magnet center 79 is aligned with the protrusion center line 78. Therefore, by fitting the key groove 46 of the flywheel 25 with the key 45, the magnet center 79 of the magnet 26a is matched with the inter-iron-core center 77 between the pair of iron cores 32a and 32b. One end 81 of the magnet 26a thereby faces the iron core 32b, and the other end 82 of the magnet 26a faces the iron core 32a.

Figure 8B:
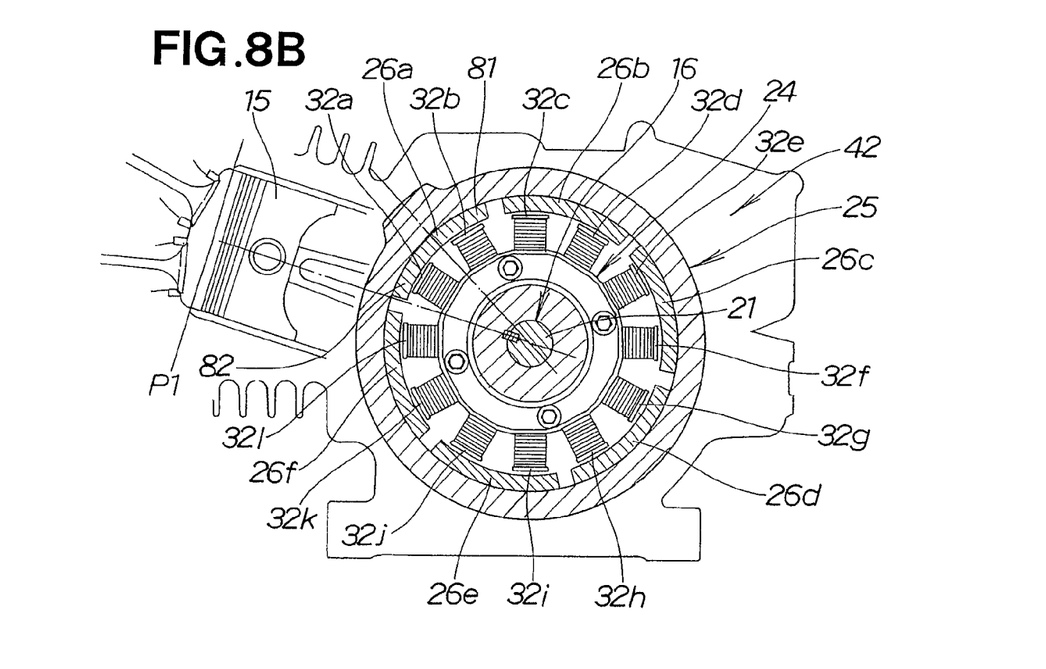

As shown in FIG. 8B, the remaining five magnets 26b through 26f are arranged in the same manner as the magnet 26a. Specifically, the magnet 26b is disposed so that one end (the N-pole) faces the iron core 32d, and the other end (the S-pole) of the magnet 26b faces the iron core 32c. The magnet 26c is disposed so that one end (the N-pole) faces the iron core 32f, and the other end (the S-pole) of the magnet 26c faces the iron core 32e. The magnet 26d is disposed so that one end (the N-pole) faces the iron core 32h, and the other end (the S-pole) of the magnet 26d faces the iron core 32g. The magnet 26e is disposed so that one end (the N-pole) faces the iron core 32j, and the other end (the S-pole) of the magnet 26e faces the iron core 32i. The magnet 26f is disposed so that one end (the N-pole) faces the iron core 32l, and the other end (the S-pole) of the magnet 26f faces the iron core 32k.

A modification of the method for assembling the generator-equipped engine 10 will next be described with reference to FIGS. 6A through 8B.

First, a plurality of magnets 26 are first prepared together with a flywheel 25 having a mounting hole 44 for mounting on the crankshaft 16 by fitting, as shown in FIG. 6B.

Then, as shown in FIG. 7B, a stator 24 having a plurality of iron cores 32 and coils 33 is prepared.

The stator 24 is then mounted on the crankcase 12 after the positions of the plurality of iron cores 32 are aligned with the center 74 (i.e., the cylinder center line 74) of the cylinder 14 as a reference, as shown in FIG. 7B. More specifically, the center between two iron cores 32a and 32l that are adjacent to each other among the plurality of iron cores 32 is aligned with the center 74 of the cylinder 14.

Either the key 45 or the key groove 46 (see FIG. 6B) is then provided to the crankshaft 16 on the straight line 74 (i.e., the reference line 74) that passes through the center 71 of the crankshaft 16 and the center 73 of the crank pin 72 when the crankshaft 16 is viewed from the shaft-end direction, as shown in FIG. 6A.

The other key selected from the key 45 (see FIG. 6A) and key groove 46 is then provided to the mounting hole 44 of the flywheel 25, as shown in FIG. 6B.

The plurality of magnets 26 are then mounted on the flywheel 25 after being arranged at an equal pitch using the position 74 of the key 45 or key groove 46 as a reference, as shown in FIG. 6B. More specifically, alignment is achieved for the center between two magnets 26a and 26f, which are two of the plurality of magnets 26 that are adjacent to each other.

The piston 15 is then set in the cylinder 14, and the piston 15 is connected to the crank pin 72 via the connecting rod 18, as shown in FIG. 7A.

The piston 15 is then set to top-dead-center P1 or bottom-dead-center P2, as shown in FIG. 7A.

As shown in FIGS. 8A and 8B, the flywheel 25 is then set on the crankshaft 16, and the key 45 and key groove 46 are fitted together, whereby the flywheel 25 is mounted on the crankshaft 16, and the operation of the generator-equipped engine 10 is completed.

Figure 9:
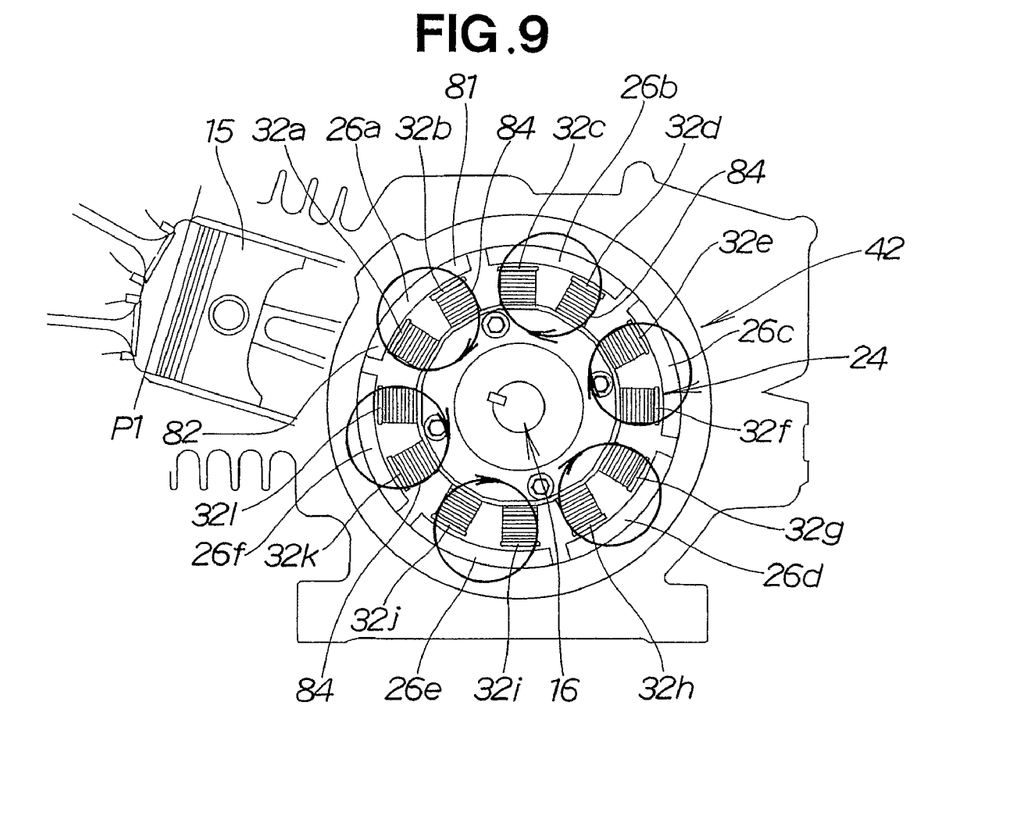
FIG. 9 is a diagram showing a state in which the generator is mounted on the engine shown in FIG. 4.

The operation of the generator 20 will next be described. As shown in FIGS. 5 and 9, when the generator 20 is stopped, a magnetic circuit is formed in which magnetic flux flows through the magnet 26a, the iron core 32a, the base 31, and the iron core 32b.

Specifically, a magnetic force line 84 acts in the magnet 26a from one end 81 (the N-pole) to the other end 82 (the S-pole). This magnetic force line 84 reaches the other end 82 (the S-pole) through the iron core 32b, the base 31, and the iron core 32a. The magnetic force 84 that acts between the one end 81 (N-pole) and the iron core 32b has the same strength as the magnetic force 84 that acts between the other end 82 (S-pole) and the iron core 32a. The magnetic force exerted on the iron core 32b by the one end 81 (N-pole) thereby matches the magnetic force exerted on the iron core 32a by the other end 82 (S-pole). Consequently, the magnet 26a is maintained in a position, i.e., the position shown in the drawing, in which the one end 81 (N-pole) faces the iron core 32b, and the other end 82 (S-pole) faces the iron core 32a.

The remaining five magnets 26b through 26f are arranged in the same manner as the magnet 26a. Specifically, the magnet 26b is maintained in the position in which one end (the N-pole) faces the iron core 32d, and the other end (the S-pole) of the magnet 26b faces the iron core 32c. The magnet 26c is maintained in the position in which one end (the N-pole) faces the iron core 32f, and the other end (the S-pole) faces the iron core 32e. The magnet 26d is maintained in the position in which one end (the N-pole) faces the iron core 32h, and the other end (the S-pole) faces the iron core 32g. The magnet 26e is maintained in the position in which one end (the N-pole) faces the iron core 32j, and the other end (the S-pole) faces the iron core 32i. The magnet 26f is maintained in the position in which one end (the N-pole) faces the iron core 32l, and the other end (the S-pole) faces the iron core 32k.

The rotor 42 can therefore be maintained in a motionless state when the rotor 42 is mounted on the stator 24. As a result, the piston 15 can be maintained in the top-dead-center P1 position. The task of preventing the rotor 42 from rotating due to magnetic force can therefore be obviated when the rotor 42 is mounted on the crankshaft 16. The process for assembling the generator-equipped engine 10 is therefore easy to perform.

The engine 10 is also provided with a valve movement mechanism for driving the exhaust valve or intake valve. The process of assembling the valve movement mechanism must be performed while the piston 15 is maintained at top-dead-center P1. However, since the piston 15 can be maintained at top-dead-center P1 when the rotor 42 is mounted on the stator 24, it becomes easier to mount the valve movement mechanism.

Configurations and methods for positioning the piston 15 at top-dead-center P1 were described in the present invention, but the present invention is not limited to these configurations, and the same effects can also be obtained when the piston 15 is positioned at bottom-dead-center P2.

It is also sufficient for the iron cores 32 and the magnets 26 if a plurality of each are provided so that the number of iron cores 32 is a multiple of the number of magnets 26.

An example was described of an engine 10 provided with a tilted cylinder 14, but this configuration is not limiting, and the present invention may also be applied, for example, to an engine provided with a vertical cylinder, or to another engine.

The procedure for mounting the key 45 is also arbitrary. For example, when the flywheel 25 is fitted onto the crankshaft 16, the key groove 47 may be aligned with the key groove 46, and the key 45 may be locked into the aligned key groove 47 and key groove 46.

INDUSTRIAL APPLICABILITY

The present invention is suitable for application to a generator-equipped engine in which the stator of the generator is fixed to the crankcase, and the rotor is mounted on the crankshaft; and to a method for assembling a generator-equipped engine.

The invention claimed is:

1. An engine equipped with a generator, characterized in that:
the generator is provided with a stator that is fixed to the crankcase of the engine, and a rotatable rotor disposed opposite the stator;
the stator comprises a plurality of iron cores arranged in the circumferential direction about the crankshaft of the engine, and coils that are wrapped around the plurality of iron cores;
the rotor comprises a flywheel that is fastened to the crankshaft by a fixing mechanism, and a plurality of permanent magnets fixed to the flywheel and arranged in the circumferential direction about the crankshaft; and
the fixing mechanism is configured so as to stop the flywheel with respect to the crankshaft in a position in which the center of one permanent magnet among the plurality of permanent magnets coincides with the center point between two adjacent iron cores among the plurality of iron cores when the piston connected to the crankshaft is either at the top-dead-center or at the bottom-dead-center.

2. The engine of claim 1, wherein:
the fixing mechanism comprises a convex fixing member, and a concave fixing member fitted with the convex fixing member;
the crankshaft comprises one member selected from the convex fixing member and the concave fixing member;
the flywheel comprises the other member selected from the convex fixing member and the concave fixing member; and
rotation of the flywheel relative to the crankshaft is restricted by the fitting of the concave fixing member with the convex fixing member.

3. The engine of claim 2, wherein:
the convex fixing member comprises a key, and the concave fixing member comprises a key groove into which the key can fit.

4. The engine of claim 2, wherein:
when the engine is viewed from the direction of an end of the crankshaft, and a straight line passing through the center of a cylinder of the engine and the center of the crankshaft is the cylinder central axis,
then the center position between any two iron cores that are adjacent to each other among the plurality of iron cores is set so as to coincide with the cylinder central axis; and
the positions of the convex and concave fixing members are set so as to coincide with the cylinder central axis when the piston is either at the top-dead-center or at the bottom-dead-center.

5. A method for assembling a generator-equipped engine, comprising the steps of:
preparing a stator having a plurality of iron cores arranged at an equal pitch in the circumferential direction about the crankshaft of the engine, and coils that are wrapped around the plurality of iron cores, as well as a flywheel that has a mounting hole and is mounted by fitting onto the crankshaft, and a plurality of magnets for mounting on the flywheel;
providing one member selected from a convex fixing member and a concave fixing member to the crankshaft on a reference line, wherein the reference line is a straight line that passes through the center of the crankshaft and the center of the crank pin when the crankshaft is viewed from the shaft end direction;
providing the other member selected from the convex fixing member and concave fixing member to the mounting hole of the flywheel;
arranging at an equal pitch and mounting all of the magnets to the flywheel after the center of one magnet as a reference among the plurality of magnets is aligned with a position that is separated by a preset prescribed angle from the position of the other fixing member in the flywheel;

connecting the piston to the crank pin via the connecting rod when the piston is set in the cylinder of the engine;

setting the piston to the top-dead-center or the bottom-dead-center;

mounting the stator on the crankcase after the center between two iron cores that are adjacent to each other is aligned, as a reference among the plurality of iron cores, with the position separated by the prescribed angle from the reference line in the stator; and attaching the flywheel to the crankshaft by fitting together the convex fixing member and the concave fixing member.

6. A method for assembling a generator-equipped engine, comprising the steps of:

preparing a stator having a plurality of iron cores arranged at an equal pitch in the circumferential direction about the crankshaft of the engine, and coils that are wrapped around the plurality of iron cores, as well as a flywheel that has a mounting hole and is mounted by fitting onto the crankshaft, and a plurality of magnets for mounting on the flywheel;

aligning the positions of the plurality of iron cores using the center of the cylinder of the engine as a reference when the stator is mounted on the crankcase;

providing one member selected from a convex fixing member and a concave fixing member to the crankshaft on the straight line that passes through the center of the crankshaft and the center of the crank pin when the crankshaft is viewed from the shaft end direction;

providing the other member selected from the convex fixing member and concave fixing member to the mounting hole of the flywheel;

arranging the plurality of magnets at an equal pitch using the position of the other fixing member as a reference when the plurality of magnets are mounted on the flywheel;

connecting the piston to the crank pin via the connecting rod when the piston is set in the cylinder;

setting the piston to the top-dead-center or the bottom-dead-center; and attaching the flywheel to the crankshaft by fitting the convex fixing member in the concave fixing member.

7. The method of claim 6, wherein:

the step for aligning the positions of the plurality of iron cores using the center of the cylinder as a reference is a step wherein the center point between two iron cores that are adjacent to each other among the plurality of iron cores is aligned with the center of the cylinder; and the step for arranging the plurality of magnets at an equal pitch using the position of the other fixing member as a reference is a step for aligning the center point between two magnets that are adjacent to each other among the plurality of magnets.

* * * * *